(12) United States Patent
Xu et al.

(10) Patent No.: US 10,857,646 B2
(45) Date of Patent: Dec. 8, 2020

(54) APPARATUS FOR CHEMICAL-MECHANICAL POLISHING (71) Applicants: Tsinghua University, Beijing (CN); HWATSING TECHNOLOGY CO., LTD., Tianjin (CN)

(72) Inventors: Zhenjie Xu, Tianjin (CN); Jian Wang, Tianjin (CN); Xiangyu Chen, Tianjin (CN); Tongqing Wang, Tianjin (CN); Kun Li, Tianjin (CN); Xinchun Lu, Tianjin (CN)

(73) Assignees: TSINGHUA UNIVERSITY, Beijing (CN); HWATSING TECHNOLOGY CO., LTD., Tianjin (CN)

( * ) Notice: Subject to any disclaimer, the term of this patent is extended or adjusted under 35 U.S.C. 154(b) by 387 days.

(21) Appl. No.: 15/777,942

(22) PCT Filed: Jan. 3, 2017

(86) PCT No.: PCT/CN2017/000070
§ 371 (c)(1),
(2) Date: May 22, 2018

(87) PCT Pub. No.: WO2017/118361
PCT Pub. Date: Jul. 13, 2017

(65) Prior Publication Data
US 2018/0345446 A1    Dec. 6, 2018

(30) Foreign Application Priority Data

Jan. 5, 2016    (CN) .......................... 2016 1 0010189

(51) Int. Cl.
B24B 37/00    (2012.01)
B24B 37/04    (2012.01)
(Continued)

(52) U.S. Cl.
CPC .............. B24B 37/04 (2013.01); B23Q 41/02 (2013.01); B24B 27/0023 (2013.01);
(Continued)

(58) Field of Classification Search
CPC ....... B24B 37/04; B24B 37/105; B24B 37/27; B24B 37/30; B24B 37/345; B23Q 41/02
(Continued)

(56) References Cited

U.S. PATENT DOCUMENTS 5,702,292 A * 12/1997 Brunelli ................. B23Q 1/488
451/285
5,947,802 A *  9/1999 Zhang ..................... B24B 37/04
451/334
(Continued)

FOREIGN PATENT DOCUMENTS

CN          1741875       3/2006
CN        101277787      10/2008
(Continued)

OTHER PUBLICATIONS

WIPO, English translation of the ISR/WO for PCT Application PCT/CN2017/000070, dated Mar. 24, 2017.
(Continued)

*Primary Examiner* — George B Nguyen
(74) *Attorney, Agent, or Firm* — Hodgson Russ LLP (57) ABSTRACT

An apparatus for chemical-mechanical polishing is provided, including: a plurality of polishing sections spaced apart from one another, each polishing section including: a bracket, a carrier head and a platen, the carrier head being disposed on the bracket and configured to move between a polishing position and a conveying position, in which when the carrier head is located at the polishing position, the carrier head is located above the platen; and a conveying assembly, the conveying assembly including: a rotating plate
(Continued)

and a plurality of loading and unloading tables, the plurality of loading and unloading tables being spaced apart from one another, disposed on the rotating plate and configured to rotate along with the rotating plate, in which when the carrier head is located at the conveying position, the carrier head is corresponding to one of the plurality of loading and unloading tables.

10 Claims, 4 Drawing Sheets

(51) Int. Cl.
    *B24B 27/00*     (2006.01)
    *B24B 37/10*     (2012.01)
    *B24B 37/30*     (2012.01)
    *B24B 37/34*     (2012.01)
    *B24B 37/27*     (2012.01)
    *B23Q 41/02*     (2006.01)

(52) U.S. Cl.
    CPC ........ *B24B 27/0069* (2013.01); *B24B 37/105* (2013.01); *B24B 37/27* (2013.01); *B24B 37/30* (2013.01); *B24B 37/345* (2013.01)

(58) Field of Classification Search
    USPC .................................................. 451/281–290
    See application file for complete search history.

(56) References Cited

U.S. PATENT DOCUMENTS

| | | | | |
|---|---|---|---|---|
| 6,168,683 B1* | 1/2001 | Cesna | ................... | B24B 37/345 |
| | | | | 156/345.13 |
| 6,585,572 B1* | 7/2003 | Saldana | ................. | B24B 37/20 |
| | | | | 257/E21.23 |
| 6,685,543 B2* | 2/2004 | Lai | ....................... | B24B 37/013 |
| | | | | 257/E21.23 |
| 6,916,231 B2* | 7/2005 | Wakabayashi | ............ | B08B 1/04 |
| | | | | 451/282 |
| 8,657,648 B2* | 2/2014 | Yamanaka | ............... | B24B 7/228 |
| | | | | 451/11 |
| 2001/0009843 A1* | 7/2001 | Hirokawa | ............. | B24B 41/068 |
| | | | | 451/160 |
| 2004/0043706 A1* | 3/2004 | Wang | ..................... | B24B 19/226 |
| | | | | 451/41 |
| 2005/0014456 A1* | 1/2005 | Hoshino | ............... | B24B 37/345 |
| | | | | 451/41 |
| 2007/0077861 A1* | 4/2007 | Chen | ...................... | B24B 37/345 |
| | | | | 451/5 |
| 2010/0081362 A1* | 4/2010 | Njegovan | ................ | G01B 5/28 |
| | | | | 451/5 |
| 2013/0130601 A1* | 5/2013 | Lu | ........................... | B24B 37/10 |
| | | | | 451/72 |
| 2016/0074988 A1* | 3/2016 | Yamaguchi | ........... | B24B 37/005 |
| | | | | 438/8 |

FOREIGN PATENT DOCUMENTS

| | | |
|---|---|---|
| CN | 101934496 | 1/2011 |
| CN | 201833275 | 5/2011 |
| CN | 102211311 | 10/2011 |
| CN | 102240927 | 11/2011 |
| CN | 102371535 | 3/2012 |
| CN | 102729133 | 10/2012 |
| CN | 103231303 | 8/2013 |
| CN | 203197693 | 9/2013 |
| CN | 203228103 | 10/2013 |
| CN | 105598827 | 5/2016 |
| JP | 2001162505 | 6/2001 |
| KR | 101297848 | 8/2013 |

OTHER PUBLICATIONS

SIPO, Office Action for CN App. No. 201610010189, dated Apr. 27, 2017.

* cited by examiner

APPARATUS FOR CHEMICAL-MECHANICAL POLISHING

CROSS REFERENCE TO RELATED APPLICATIONS

The present application is a U.S. National Phase application under 35 USC § 371 of International Patent Application No. PCT/CN2017/000070, filed on Jan. 3, 2017, which claims the benefit of Chinese Application No. 201610010189.1, filed with the State Intellectual Property Office of P. R. China on Jan. 5, 2016. The entire contents of the aforementioned patent applications are incorporated by reference as part of the present disclosure.

FIELD

The present disclosure relates to a technical field of polishing machines, and more particularly to an apparatus for chemical-mechanical polishing.

BACKGROUND

In a production process of a large scale integrated circuit, a chemical-mechanical polishing process needs to be used many times to remove surface materials of a substrate, so as to improve a surface quality thereof. An apparatus for chemical-mechanical polishing is a main device to complete such work. Usually, in order for the chemical-mechanical polishing of the substrate, multiple polishing modules are needed to perform multiple process steps.

Currently, in terms of conveying the substrate among the polishing modules, the usual apparatus for chemical-mechanical polishing has two methods mainly. One substrate conveying method is that, a polishing-head driving device and a carrier head are disposed on a rotatable polishing-head bracket. After the substrate has been polished on a platen, the polishing-head bracket rotates and transfers the carrier head to the next platen to polish the substrate. With applying the rotatable polishing-head bracket to convey the substrate, following problems exist: 1) a gap exists at a rotating structure of the polishing-head bracket, thus resulting in an insufficient stability of the polishing-head bracket and thereby a poor process stability; 2) when the multiple carrier heads on the polishing-head bracket are polishing at the same time, an interference exists among the carrier heads, thus leading to a complicated polishing process debugging; 3) since the carrier head is hung on a cantilever of the polishing-head bracket, the cantilever extending out enlarges the rotation error, thus resulting in a poor positioning accuracy of the carrier head on the loading and unloading table.

The other substrate conveying method is that, the substrate is conveyed among the polishing modules through a manipulator. With applying the manipulator to convey the substrate, following problems exist: 1) the manipulator occupies a large space, thus resulting in a large oversize of the apparatus for chemical-mechanical polishing; 2) when conveying the substrate, the manipulator needs to catch and release the substrate and also carry the substrate to move frequently, thus resulting in a complex movement and a low efficiency.

SUMMARY

Embodiments of the present disclosure seek to solve at least one of the problems existing in the related art to at least some extent. For that reason, embodiments of the present disclosure provide an apparatus for chemical-mechanical polishing having a better process stability.

The apparatus for chemical-mechanical polishing according to embodiments of the present disclosure includes: a plurality of polishing sections, the plurality of polishing sections being spaced apart from one another and each polishing section including: a bracket, a carrier head and a platen, the carrier head being disposed on the bracket and configured to move between a polishing position and a conveying position, in which when the carrier head is located at the polishing position, the carrier head is located above the platen; and a conveying assembly, the conveying assembly including: a rotating plate and a plurality of loading and unloading tables, the plurality of loading and unloading tables being spaced apart from one another, disposed on the rotating plate and configured to rotate along with the rotating plate, in which when the carrier head is located at the conveying position, the carrier head is corresponding to one of the plurality of loading and unloading tables.

In the apparatus for chemical-mechanical polishing according to embodiments of the present disclosure, by fixing the position of the bracket, the mounting stability of the bracket may be improved and the working reliability of the polishing section may be improved. In addition, the polishing sections are independent from one another and are not interfered mutually, which may improve the process stability of the polishing section and simplify the polishing process. Moreover, by adopting the conveying assembly to convey the substrate, the conveying efficiency of the substrate may be improved effectively and the production efficiency of the apparatus for chemical-mechanical polishing may be improved. In addition, the conveying assembly occupies a small space, which may effectively save the space of the apparatus for chemical-mechanical polishing.

In addition, the apparatus for chemical-mechanical polishing according to embodiments of the present disclosure may further have the following additional technical features.

In some embodiments of the present disclosure, the bracket is provided with a translation driving device, and the translation driving device is configured to drive the carrier head to move.

In some embodiments of the present disclosure, the bracket is provided with a groove extending along a length direction of the bracket, the apparatus for chemical-mechanical polishing further includes a rotation driving device, and the rotation driving device is disposed on the translation driving device and has at least a part passing downwards through the groove to be connected with the carrier head.

In some embodiments of the present disclosure, two translation driving devices are provided and disposed at both sides of the groove respectively.

In some embodiments of the present disclosure, the bracket includes: a horizontal plate and supporting plates located at both sides of the horizontal plate respectively, the translation driving device and the groove are disposed on the horizontal plate, and the horizontal plate extends toward the conveying assembly.

In some embodiments of the present disclosure, the plurality of polishing sections are disposed and spaced apart from one another around the conveying assembly, both sides of one end of each horizontal plate away from the supporting plate are provided with an inclined edge respectively, and the inclined edges of two adjacent horizontal plates are in contact with each other.

In some embodiments of the present disclosure, the plurality of loading and unloading tables are disposed and spaced apart from one another around a center of the rotating plate uniformly.

In some embodiments of the present disclosure, the amount of the plurality of loading and unloading tables is represented by m, the amount of the plurality of polishing sections is represented by n, an included angle between two adjacent grooves is equal to an included angle between two adjacent loading and unloading tables, and m and n meet a formula: in which m and n are positive integers.

In some embodiments of the present disclosure, m and n meet the formula: m−n=1.

In some embodiments of the present disclosure, each polishing section further includes a polishing-section platform, and the platen and the bracket are mounted on the polishing-section platform; the conveying assembly includes a conveying platform, a rotating shaft is connected between the rotating plate and the conveying platform and configured to rotate relative to the conveying platform, and the bracket extends toward a center of the rotating shaft.

REFERENCE NUMERALS apparatus for chemical-mechanical polishing 100;

polishing section 10; bracket 11; horizontal plate 11a; supporting plate 11b; inclined edge 11c; carrier head 12; platen 13; translation driving device 14; groove 15; rotation driving device 16; polishing-section platform 17;

conveying assembly 20; rotating plate 21; mounting position 21a; loading and unloading table 22; conveying platform 23; rotating shaft 24.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure.

An apparatus for chemical-mechanical polishing 100 according to embodiments of the present disclosure will be described in detail with reference to drawings.

Figure 1:
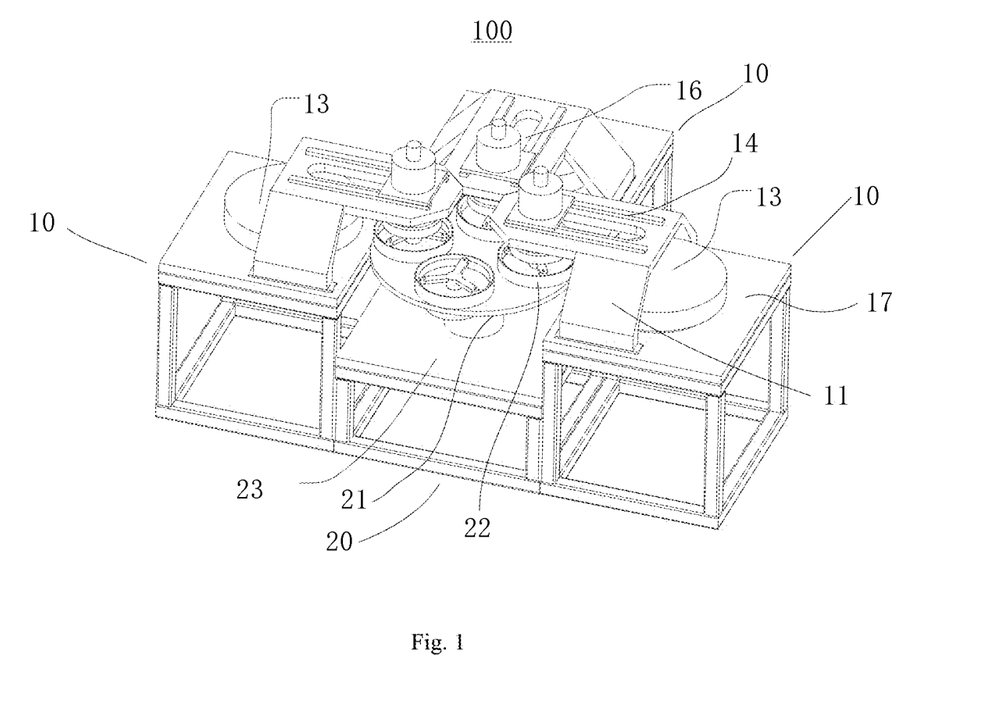
FIG. 1 is schematic view of an apparatus for chemical-mechanical polishing according to embodiments of the present disclosure.

The apparatus for chemical-mechanical polishing 100 according to embodiments of the present disclosure includes: a plurality of polishing sections 10 and a conveying assembly 20. The plurality of polishing sections 10 may be disposed around the conveying assembly 20. As shown in FIG. 1, the plurality of polishing sections 10 are spaced apart from one another, each polishing section 10 includes: a bracket 11, a carrier head 12 and a platen 13, and the carrier head 12 is disposed on the bracket 11 and configured to move between a polishing position and a conveying position. When the carrier head 12 is located at the polishing position, the carrier head 12 is located above the platen 13. It can be understood that, the carrier head 12 may convey a substrate to the platen 13 so as to conduct a polishing treatment on the substrate. In addition, after a position of the bracket 11 is fixed, the mounting stability of the bracket 11 is great, and the working reliability of the polishing section 10 is good. In addition, each polishing section 10 is independent from one another and is not interfered mutually, which improves the process stability of the polishing section 10 and simplifies the polishing process.

The conveying assembly 20 includes: a rotating plate 21 and a plurality of loading and unloading tables 22. The plurality of loading and unloading tables 22 are spaced apart from one another and disposed on the rotating plate 21, and moreover the plurality of loading and unloading tables 22 may rotate along with the rotating plate 21. When the carrier head 12 is located at the conveying position, the carrier head 12 is corresponding to one of the plurality of loading and unloading tables 22. It can be understood that, the carrier head 12 may convey the substrate located on the loading and unloading table 22 to the platen 13, and when the substrate completes the polishing treatment thereof on the platen 13, the carrier head 12 may further convey the substrate to the loading and unloading tables 22, such that the carrier head 12 can complete the polishing and the conveying of the substrate. By adopting the conveying assembly 20 to convey the substrate, the conveying efficiency of the substrate may be improved effectively and the production efficiency of the apparatus for chemical-mechanical polishing 100 may be improved. In addition, the conveying assembly 20 occupies a small space, which may effectively save the space of the apparatus for chemical-mechanical polishing 100.

Thus, in the apparatus for chemical-mechanical polishing 100 according to embodiments of the present disclosure, by fixing the position of the bracket 11, the mounting stability of the bracket 11 may be improved and the working reliability of the polishing section 10 may be improved. In addition, respective polishing sections 10 are independent from one another and are not interfered mutually, which improves the process stability of the polishing section 10 and simplifies the polishing process. Moreover, by adopting the conveying assembly 20 to convey the substrate, the conveying efficiency of the substrate may be improved effectively and the production efficiency of the apparatus for chemical-mechanical polishing 100 may be improved. In addition, the occupied space of the conveying assembly 20 is small, which may effectively save the space of the apparatus for chemical-mechanical polishing 100.

Figure 2:
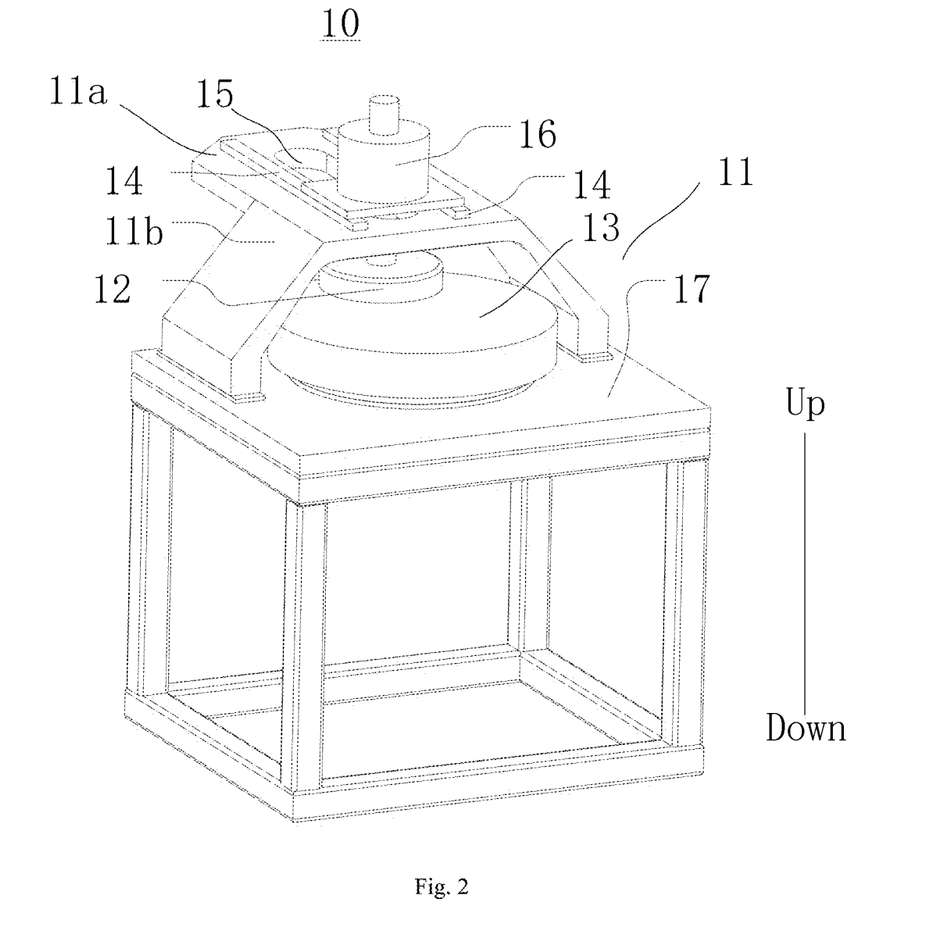
FIG. 2 is a schematic view of a polishing section of the apparatus for chemical-mechanical polishing shown in FIG. 1.

In some examples of the present disclosure, as shown in FIG. 1 and FIG. 2, the bracket 11 may be provided with a translation driving device 14, and the translation driving device 14 is configured to drive the carrier head 12 to move. The translation driving device 14 may be used to drive the carrier head 12 to reciprocate between the polishing position and the conveying position. By providing the translation driving device 14, the positioning accuracy of the carrier head 12 may be enhanced effectively and the working reliability of the carrier head 12 may be improved. Optionally, the translation driving device 14 may be a combination of two guiding rails and a synchronous belt, or the translation driving device 14 may be a combination of a guiding rail and a lead screw module.

Figure 3:
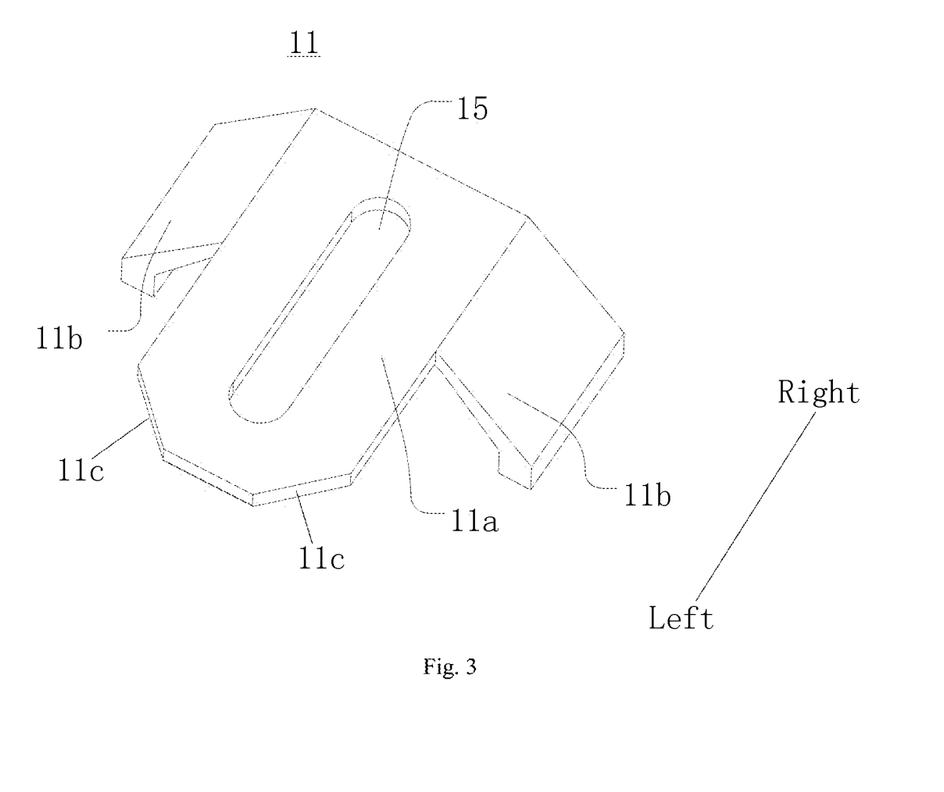
FIG. 3 is a schematic view of a bracket in the polishing section shown in FIG. 2.

Optionally, as shown in FIG. 3, the bracket 11 is provided with a groove 15 extending along a length direction of the bracket 11 (that is a left-right direction shown in FIG. 3). As shown in FIG. 1, the apparatus for chemical-mechanical polishing 100 may further include: a rotation driving device 16, the rotation driving device 16 is disposed on the translation driving device 14, and at least a part of the rotation driving device 16 passes downwards through the groove 15 so as to be connected with the carrier head 12. It can be understood that, a part of the rotation driving device 16 is disposed on the translation driving device 14, and another part thereof may pass through the groove 15 and be connected with the carrier head 12 located below the translation driving device 14. The rotation driving device 16 may drive the carrier head 12 to rotate, so as to conduct the polishing treatment on the substrate, and the translation driving device 14 may drive the carrier head 12 to reciprocate between the polishing position and the conveying position. Optionally, the rotation driving device 16 mainly includes a direct drive motor and a main shaft. The main shaft passes through a rotor of the direct drive motor, and then the rotor drives the main shaft to rotate, such that the carrier head 12 hung on a lower end of the main shaft is enabled to rotate.

Preferably, as shown in FIG. 2, two translation driving devices 14 may be provided and disposed at both sides of the groove 15 respectively. The rotation driving device 16 may be disposed on the two translation driving devices 14 at the same time, such that the stability of mounting the rotation driving device 16 on the translation driving device 14 may be improved and the working reliability of the translation driving devices 14 may be enhanced.

In some specific examples of the present disclosure, as shown in FIG. 2 and FIG. 3, the bracket 11 may include: a horizontal plate 11a and supporting plates 11b located at both sides of the horizontal plate 11a respectively, the translation driving device 14 and the groove 15 are disposed on the horizontal plate 11a, and the horizontal plate 11a extends toward the conveying assembly 20. Specifically, as shown in FIG. 1 and FIG. 2, each polishing section 10 may further include a polishing-section platform 17, and the platen 13 and the bracket 11 are mounted on the polishing-section platform 17. The bracket 11 may be mounted on the polishing-section platform 17 through the two supporting plates 11b, and the two supporting plates 11b may be located at both sides of the platen 13 respectively, such that part of the horizontal plate 11a may be enabled to be located above the platen 13, and thus the substrate may be located above the platen 13 when the carrier head 12 is located at the polishing position. A part of the horizontal plate 11a facing toward the conveying assembly 20 may be located above the loading and unloading table 22, such that when the translation driving device 14 drives the carrier head 12 to move to the conveying position, the carrier head 12 may be located right above the loading and unloading table 22. Optionally, in combination of what shown in FIG. 1 and FIG. 3, the plurality of polishing sections 10 may be disposed and spaced apart from one another around the conveying assembly 20, both sides of one end of each horizontal plate 11a away from the supporting plate 11b are provided with an inclined edge 11c respectively, and the inclined edges 11c of two adjacent horizontal plates 11a are in contact with each other. The inclined edges 11c of the horizontal plates 11a of two adjacent polishing sections 10 may be opposed mutually, such that the two adjacent polishing sections 10 abut against each other, thus improving the mounting reliability of the polishing section 10.

Figure 4:
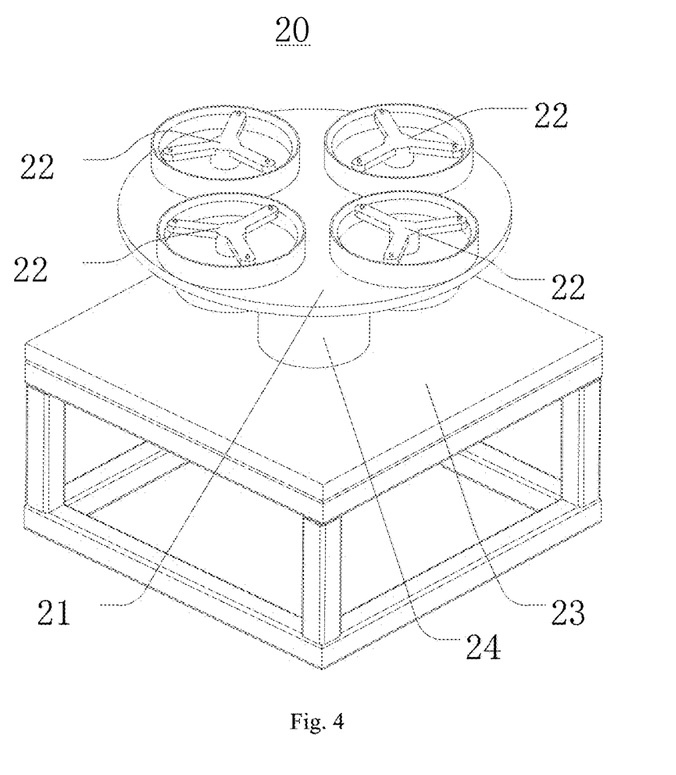
FIG. 4 is a schematic view of a conveying assembly of the apparatus for chemical-mechanical polishing shown in FIG. 1.

According to a preferable embodiment of the present disclosure, as shown in FIG. 4, the plurality of loading and unloading tables 22 may be disposed and spaced apart from one another around a center of the rotating plate 21 uniformly. Thus, part of the plurality of loading and unloading tables 22 may be corresponding to the plurality of polishing sections 10, such that after the rotating plate 21 rotates by a predetermined angle, the loading and unloading tables 22 may convey the substrate from one polishing section 10 to the next polishing section 10, so as to conduct the further polishing treatment on the substrate, thereby facilitating the working of the polishing section 10.

Optionally, the amount of the plurality of loading and unloading tables 22 is represented by m, the amount of the plurality of polishing sections 10 is represented by n, an included angle between two adjacent grooves 15 is equal to an included angle between two adjacent loading and unloading tables 22, and m and n meet a formula: m−n≥1, in which m and n are positive integers. Thus, each groove 15 corresponds to one loading and unloading table 22, and each polishing section 10 corresponds to one loading and unloading table 22, thereby ensuring the normal working of the apparatus for chemical-mechanical polishing 100. Moreover, by providing the loading and unloading tables 22 more than the polishing sections 10, the substrate is easy to be placed and taken out, thereby increasing the use convenience of the apparatus for chemical-mechanical polishing 100. Preferably, m=1+n. As shown in FIG. 1, the amount of the loading and unloading tables 22 is four, and the amount of the polishing sections 10 is three. An operator may place the substrate on the loading and unloading table 22 which is not corresponding to any polishing section 10, and after the rotating plate 21 rotates by the predetermined angle, the loading and unloading table 22 loaded with the substrate conveys the substrate underneath of the first polishing section 10. Then, the carrier head 12 catches the substrate and conveys the substrate above the platen 13, so as to conduct the polishing treatment on the substrate. The substrate having been polished is conveyed to the loading and unloading table 22 by the carrier head 12, and the rotating plate 21 rotates by the predetermined angle again, so that the loading and unloading table 22 loaded with the substrate conveys the substrate underneath the next polishing section 10, so as to facilitate the polishing section 10 to conduct the further polishing treatment on the substrate. After the substrate has been polished for many times, the rotating plate 21 may convey the loading and unloading table 22 loaded with the substrate to an initial position, and thereby the apparatus for chemical-mechanical polishing 100 completes the polishing process of the substrate. Preferably, the predetermined angle may be 90°.

Optionally, as shown in FIG. 1 and FIG. 4, the conveying assembly 20 may include a conveying platform 23, a rotating shaft 24 is connected between the rotating plate 21 and the conveying platform 23 and configured to rotate relative to the conveying platform 23, and the bracket 11 may extend toward a center of the rotating shaft 24. Thus, the groove 15 may extend toward the center of the rotating shaft 24, thereby facilitating the translation driving device 14 to drive the carrier head 12 and the substrate to move toward the loading and unloading table 22 on the rotating plate 21.

Figure 5:
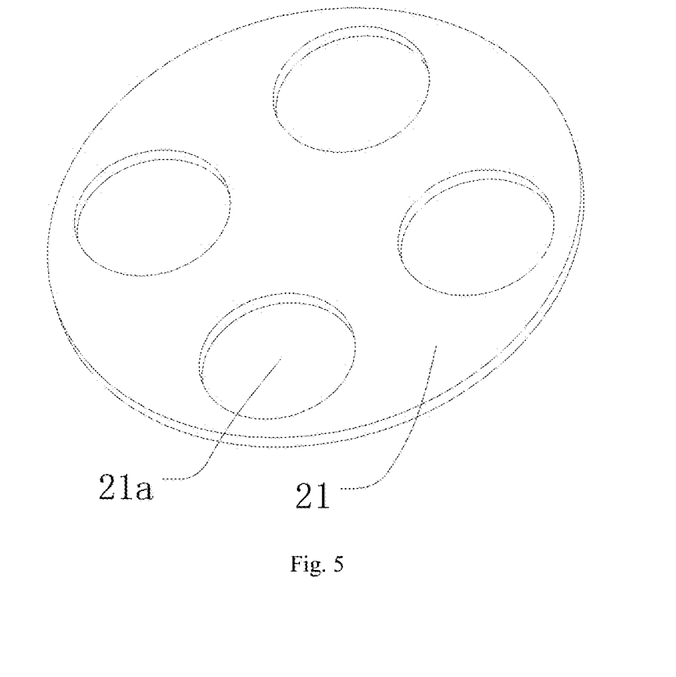
FIG. 5 is a schematic view of a rotating plate in the conveying assembly shown in FIG. 4.

Optionally, as shown in FIG. 5, the rotating plate 21 may be provided with a plurality of mounting positions 21a evenly spaced apart from one another, and the plurality of loading and unloading tables 22 are mounted in corresponding mounting positions 21a respectively.

When the rotating plate 21 rotates, the operator may take away the substrate having completed the polishing thereof and located on the loading and unloading table 22 remaining at the initial position, and then the operator may place another substrate to be polished on such loading and unloading table 22. The rotating plate 21 rotates by 90°, so as to convey the loading and unloading table 22 loaded with the substrate to a predetermined position.

Or, when all the loading and unloading tables 22 have been loaded with the substrate, the rotating plate 21 rotates straight in one direction. Or, when rotation of the rotating plate 21 in one direction reaches 270° and all the loading and unloading tables 22 have been loaded with the substrate, the rotating plate 21 rotates reversely by 270°. Or, when the rotation of the rotating plate 21 in one direction reaches a certain angle and all the loading and unloading tables 22 are empty, the rotating plate 21 rotates reversely by the same angle and returns to the initial position.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

The invention claimed is:

1. An apparatus for chemical-mechanical polishing, said apparatus comprising:
   a plurality of polishing sections, the plurality of polishing sections being spaced apart from one another and each polishing section comprising: a bracket, a carrier head and a platen, the carrier head being disposed on the bracket and configured to move between a polishing position and a conveying position, wherein when the carrier head is located at the polishing position, the carrier head is located above the platen; and
   a conveying assembly, the conveying assembly comprising: a rotating plate and a plurality of loading and unloading tables, the plurality of loading and unloading tables being spaced apart from one another, disposed on the rotating plate and configured to rotate along with the rotating plate, wherein when the carrier head is located at the conveying position, the carrier head is corresponding to one of the plurality of loading and unloading tables.

2. The apparatus for chemical-mechanical polishing according to claim 1, wherein the bracket is provided with a translation driving device, and the translation driving device is configured to drive the carrier head to move.

3. The apparatus for chemical-mechanical polishing according to claim 2, wherein the bracket is provided with a groove extending along a length direction of the bracket, and
   wherein the apparatus for chemical-mechanical polishing further comprises a rotation driving device, and the rotation driving device is disposed on the translation driving device and has at least a part passing downwards through the groove to be connected with the carrier head.

4. The apparatus for chemical-mechanical polishing according to claim 3, wherein two translation driving devices are provided and disposed at both sides of the groove respectively.

5. The apparatus for chemical-mechanical polishing according to claim 3, wherein the bracket comprises: a horizontal plate and supporting plates located at both sides of the horizontal plate respectively, the translation driving device and the groove are disposed on the horizontal plate, and the horizontal plate extends toward the conveying assembly.

6. The apparatus for chemical-mechanical polishing according to claim 5, wherein the plurality of polishing sections are disposed and spaced apart from one another around the conveying assembly, both sides of one end of each horizontal plate away from the supporting plate are provided with an inclined edge respectively, and the inclined edges of two adjacent horizontal plates are in contact with each other.

7. The apparatus for chemical-mechanical polishing according to claim 1, wherein the plurality of loading and unloading tables are disposed and spaced apart from one another around a center of the rotating plate uniformly.

8. The apparatus for chemical-mechanical polishing according to claim 3, wherein the amount of the plurality of loading and unloading tables is represented by m, the amount of the plurality of polishing section is represented by n, an included angle between two adjacent grooves is equal to an included angle between two adjacent loading and unloading tables, and m and n meet a formula: $m-n \geq 1$, wherein m and n are positive integers.

9. The apparatus for chemical-mechanical polishing according to claim 8, wherein m and n meet the formula: $m-n=1$.

10. The apparatus for chemical-mechanical polishing according to claim 3, wherein each polishing section further comprises a polishing-section platform, and the platen and the bracket are mounted on the polishing-section platform, and
    wherein the conveying assembly comprises a conveying platform, a rotating shaft is connected between the rotating plate and the conveying platform and configured to rotate relative to the conveying platform, and the bracket extends toward a center of the rotating shaft.

* * * * *